(12) United States Patent
Ranganathan et al.

(10) Patent No.: US 9,777,206 B2
(45) Date of Patent: Oct. 3, 2017

(54) THERMALLY CONDUCTIVE COMPOSITIONS AND CABLES THEREOF

(71) Applicant: GENERAL CABLE TECHNOLOGIES CORPORATION, Highland Heights, KY (US)

(72) Inventors: Sathish Kumar Ranganathan, Indianapolis, IN (US); Vijay Mhetar, Westfield, IN (US); Srinivas Siripurapu, Carmel, IN (US); Jon Michael Malinoski, Zionsville, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/566,134

(22) Filed: Dec. 10, 2014

(65) Prior Publication Data

US 2015/0159069 A1    Jun. 11, 2015

Related U.S. Application Data

(60) Provisional application No. 61/914,098, filed on Dec. 10, 2013.

(51) Int. Cl.
| | |
|---|---|
| *H01B 7/00* | (2006.01) |
| *C09K 5/14* | (2006.01) |
| *H01B 3/44* | (2006.01) |
| *H01B 1/02* | (2006.01) |
| *H01B 7/295* | (2006.01) |

(52) U.S. Cl.
CPC ............... *C09K 5/14* (2013.01); *H01B 1/026* (2013.01); *H01B 3/441* (2013.01); *H01B 7/295* (2013.01)

(58) Field of Classification Search
USPC ...... 174/102 R, 102 SC, 108, 110 R, 110 SC
See application file for complete search history.

(56) References Cited

U.S. PATENT DOCUMENTS

| | | | |
|---|---|---|---|
| 4,243,579 A | 1/1981 | Keogh | |
| 5,025,042 A | 6/1991 | Yoshida et al. | |
| 5,036,121 A * | 7/1991 | Coaker ................. | H01B 3/443 174/110 V |
| 5,211,746 A | 5/1993 | Keogh et al. | |
| 5,236,622 A | 8/1993 | Yoneda et al. | |
| 5,236,985 A | 8/1993 | Hayami | |
| 5,262,467 A | 11/1993 | Keogh et al. | |
| 5,288,785 A | 2/1994 | Jow et al. | |
| 5,470,657 A | 11/1995 | Hayami | |
| 5,482,990 A | 1/1996 | Jow et al. | |
| 5,494,949 A | 2/1996 | Kinkel et al. | |
| 5,589,219 A | 12/1996 | Hayami | |
| 5,780,531 A | 7/1998 | Scholl | |
| 5,930,459 A | 7/1999 | Eckman et al. | |
| 6,011,087 A | 1/2000 | Marshall et al. | |
| 6,197,864 B1 | 3/2001 | Borke et al. | |
| 6,329,454 B1 | 12/2001 | Krabbenborg | |
| 6,339,189 B1 | 1/2002 | Caimi | |
| 6,376,623 B1 | 4/2002 | Hoenig et al. | |
| 6,451,894 B1 | 9/2002 | Srinivasan et al. | |
| 6,500,882 B1 * | 12/2002 | Hiraishi ................... | C08K 9/08 174/110 PM |
| 6,673,855 B1 | 1/2004 | Braga et al. | |
| 7,186,768 B2 | 3/2007 | Korth et al. | |
| 7,759,580 B2 | 7/2010 | Park et al. | |
| 7,972,691 B2 | 7/2011 | Chiruvolu et al. | |
| 8,097,809 B2 | 1/2012 | Galletti et al. | |
| 9,087,629 B2 | 7/2015 | Bates | |
| 9,115,274 B2 | 8/2015 | Bates | |
| 2002/0107315 A1 * | 8/2002 | Chaudhary .......... | C08K 5/0066 524/371 |
| 2002/0108772 A1 | 8/2002 | Hase et al. | |
| 2003/0191213 A1 * | 10/2003 | Troutman ............ | C07D 211/94 524/99 |
| 2003/0207969 A1 * | 11/2003 | Capocci ............... | C08K 5/0066 524/236 |
| 2004/0097620 A1 * | 5/2004 | Kaprinidis ............... | C08K 3/26 524/99 |
| 2005/0205290 A1 | 9/2005 | Pinacci et al. | |
| 2008/0167412 A1 | 7/2008 | Elgimiabi et al. | |
| 2009/0020311 A1 | 1/2009 | Park et al. | |
| 2009/0048382 A1 | 2/2009 | Lee et al. | |
| 2009/0238957 A1 | 9/2009 | Clancy | |
| 2010/0132974 A1 | 6/2010 | Inagaki et al. | |
| 2011/0010038 A1 * | 1/2011 | Inayoshi ................ | B60N 2/002 701/31.4 |
| 2011/0144244 A1 * | 6/2011 | Lee ...................... | C08K 3/0058 524/84 |
| 2011/0266026 A1 | 11/2011 | Nonaka | |
| 2012/0244305 A1 | 9/2012 | Chen et al. | |
| 2012/0273253 A1 | 11/2012 | Nilsson et al. | |

FOREIGN PATENT DOCUMENTS

| | | |
|---|---|---|
| CN | 101921437 A | 12/2010 |
| CN | 102140192 A | 8/2011 |
| CN | 103403092 A | 11/2013 |
| EP | 1092752 A2 | 4/2001 |
| JP | 2002-212378 A | 7/2002 |
| WO | 2008016975 A2 | 2/2008 |

OTHER PUBLICATIONS

Thomas, Shane; International Search Report and Written Opinion of the International Searching Authority, issued in International Application No. PCT/US2014/069531; dated as mailed on Mar. 17, 2015; 9 pages.

* cited by examiner

*Primary Examiner* — William H Mayo, III
(74) *Attorney, Agent, or Firm* — Ulmer & Berne LLP

(57) ABSTRACT

Thermally conductive compositions exhibiting a thermal conductivity of 0.30 W/mK or more include a base polyolefin, a halogenated flame retardant, a non-halogenated flame retardant, and a flame retardant synergist. Cables include insulation and/or jacket layers formed of such thermally conductive compositions.

16 Claims, No Drawings

US 9,777,206 B2

THERMALLY CONDUCTIVE COMPOSITIONS AND CABLES THEREOF

REFERENCE TO RELATED APPLICATION

The present application claims priority of U.S. provisional application Ser. No. 61/914,098, entitled IMPROVED POWER CABLE, filed Dec. 10, 2013, and hereby incorporates the same application herein by reference in its entirety.

TECHNICAL FIELD

The present disclosure generally relates to thermally conductive compositions that are electrically insulating, flame retarding, flexible, and which exhibit improved heat transfer and radiative properties. The compositions are useful in the formation of cable insulation and jacket layers.

BACKGROUND

Cables typically include one or more insulation and/or jacket layers surrounding the conductor of the cable. Conventionally, such insulation and jacket layers are formed from materials that exhibit a relatively low thermal conductivity which can impair heat transfer from the conductor to an outer surface of the cable. Such impairment can lead to an increase in the conductor's operating temperature resulting in increased resistance and/or a decrease in power carrying capacity. There is, therefore, a need for compositions that offer improved thermal conductivity to allow cable conductors to operate at lower temperatures than conductors in conventional cables while still maintaining necessary electrical, physical, and fire-retardancy qualifications.

SUMMARY

In accordance with one example, a thermally conductive composition includes a base polyolefin, a halogenated flame retardant, a non-halogenated flame retardant and a flame retardant synergist. The non-halogenated flame retardant includes one or more of a metal oxide flame retardant and a metal hydroxide flame retardant. The thermally conductive composition exhibits a thermal conductivity of 0.30 W/mK or more, and an elongation at break of about 100% or more.

In accordance with another example, a cable includes a conductor, one or more insulation layers, and a jacket layer. At least one of the one or more insulation layers and jacket layers are formed of a thermally conductive composition. The composition includes a base polyolefin, a halogenated flame retardant, a non-halogenated flame retardant and a flame retardant synergist. The non-halogenated flame retardant includes one or more of a metal oxide flame retardant and a metal hydroxide flame retardant. The thermally conductive composition exhibits a thermal conductivity of 0.30 W/mK or more. The cable passes the UL 1581 VW-1 test.

DETAILED DESCRIPTION

Improvements to either the thermal conductivity or the heat radiative properties of a cable can provide a number of desirable benefits. For example, such improvements can allow for a power cable to experience a beneficial mix of properties including a reduction in a conductor's operating temperature, a reduction in the conductor's resistance and power losses, and an increase in the conductor's current carrying capacity. As can be appreciated, these benefits can be tailored for specific applications. For example, in certain embodiments, cables having improved heat transfer and heat radiative properties can have a smaller conductor size, while maintaining the same current carrying capacity. Cables or wires with reduced conductor size can be more flexible, have lower weight, and can cost less to produce.

Improvements to the thermal conductivity or the heat radiative properties of a cable can be achieved through the use of one or more insulation and jacket layers that are formed from a thermally conductive composition. Such compositions can provide a thermal conductivity, measured in accordance with ASTM E1952 (2011) mDSC method of 0.30 W/mK or more. The thermally conductive compositions can also exhibit an improved emissivity (E), when measured in accordance to ASTM E408 (2013) at a temperature of 27° C., of about 0.5 or more in certain embodiments, of about 0.75 or more in certain embodiments, and of about 0.9 or more in certain embodiments. Such improvements to emissivity (E) can occur while still maintaining a low absorptivity. As can be appreciated, a low absorptivity can mean that cables or wires do not absorb significant quantities of heat when exposed to external radiation.

In certain embodiments, insulation and jacket layers can additionally pass a variety of other physical, mechanical, and electrical qualifications including, for example, the UL-1581 VW-1 flame test when measured in accordance with UL 2556 (2013) on a 10 American Wire Gauge ("AWG") conductor and the UL 44 (2010) long-term insulation resistance ("LTIR") tests under both wet and dry conditions at both 75° C. and at 90° C. In certain embodiments, 14 AWG cables can additionally pass the UL-1581 VW-1 flame test. The thermally conductive compositions can additionally have an elongation at break, when measured in accordance to ASTM D412 (2010) using molded plaques, of about 100% or more in certain embodiments, of about 150% or more, in certain embodiments, and of about 200% or more in certain embodiments. It will be appreciated that cross-linked or non-cross-linked resins can be used in insulation layers and/or jacket layers.

According to certain embodiments, thermally conductive compositions can include a base polyolefin, a halogenated flame retardant, a flame retardant synergist, and a non-halogenated flame retardant. In certain embodiments, such thermally conductive compositions can include about 100 phr of a base polyolefin, about 10 phr to about 70 phr of a halogenated flame retardant, about 5 phr to about 35 phr of a flame retardant synergist, and about 100 phr to about 200 phr of a non-halogenated flame retardant including a metal oxide and/or a metal hydroxide.

According to certain embodiments, the base polyolefin of the thermally conductive composition can be selected from a variety of suitable polyolefins, copolymers, or blends thereof.

In certain embodiments, a suitable base polyolefin can include polyolefins produced from alkenes having the general formula $C_nH_{2n}$. Non-limiting examples of such polyolefins can include polyethylene (including low-density polyethylene ("LDPE"), high-density polyethylene ("HDPE"), high molecular weight polyethylene ("HMWPE"), ultra-high molecular weight polyethylene ("UHMWPE"), linear-low-density polyethylene ("LLDPE"), and very-low density, polyethylene), maleated polypropylene, polypropylene, polybutylene, polyhexalene, po lyoctene, or copolymers, mixtures, blends, and alloys thereof. An example of a suitable copolymer, according to certain embodiments, is ethylene vinyl acetate ("EVA").

In certain embodiments, a suitable base polyolefin can be a metallocene-catalyzed olefin copolymer. As can be appreciated, metallocene-catalyzed olefin copolymers can have precise polymeric structures and can be used, for example, to modify the modulus of the base polyolefin. Metallocene-catalyzed olefin copolymers can also be used to assist in the processability of thermally conductive compositions.

Suitable metallocene-catalyzed olefin copolymers are well known in the art, and include, for example, the metallocene-catalyzed olefin copolymers disclosed in U.S. Pat. Nos. 6,451,894; 6,376,623; and 6,329,454 each incorporated by reference herein. As can be appreciated, suitable metallocene-catalyzed olefin copolymers can additionally, or alternatively, be commercially obtained from, for example, the Exxon Mobil Corporation or the Dow Chemical Company.

Non-limiting examples of suitable metallocene-catalyzed olefin copolymers can include ethylene copolymerized with an olefin monomer having from 3 to 18 carbon atoms such as octene. As can be appreciated, the use of octene as a monomer can allow for variation in the melt flow properties of the polymerized copolymer.

Alternatively, or additionally, the base polyolefin of the thermally conductive composition can also include ethylene polymerized with at least one comonomer selected from the group consisting of $C_3$ to $C_{20}$ alpha-olefins and $C_3$ to $C_{20}$ polyenes. According to certain embodiments, a base polyolefin can include ethylene/alpha-olefin copolymers and/or ethylene/alpha-olefin/diene terpolymers.

In certain embodiments, suitable alpha-olefins can contain about 3 to about 20 carbon atoms, in certain embodiments, from about 3 to about 16 carbon atoms, and in certain embodiments, from about 3 to about 8 carbon atoms. As non-limiting examples, suitable alpha-olefins can include one or more of propylene, 1-butene, 1-pentene, 1-hexene, 1-octene and 1-dodecene.

Generally, suitable polyene comonomers can have about 3 to about 20 carbon atoms. In certain embodiments, polyene can have about 4 to about 20 carbon atoms, and in certain embodiments, can have about 4 to about 15 carbon atoms. In certain embodiments, the polyene can be a diene, and more specifically can be a straight chain, branched chain, or cyclic hydrocarbon diene and can, in certain embodiments, further be a non-conjugated diene. Examples of specific suitable dienes can include straight chain acyclic dienes such as: 1,3-butadiene, 1,4-hexadiene and 1,6-octadiene; branched chain acyclic dienes such as: 5-methyl-1, 4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-iene; alkenyl, alkylidene, cycloalkenyl and cyclo alkylidene norbornenes such as 5-methylene-2morbornene ("MNB"), 5-propenyl-2-norbornene, 5-isopropylidene-2-norbornene, 5-(4-cyclopentenyl)-2-norbornene, 5-cyclohexylidene-2-norbornene, and norbornene. As can be appreciated, 1,4-hexadiene, 5-ethylidene-2-norbornene, 5-vinyllidene-2-norbornene, 5-methylene-2-norbornene and dicyclopentadiene can be particularly advantageous in the preparation of certain ethylene-propylene rubbers ("EPR").

In certain embodiments, a base polyolefin can additionally, or alternatively, include non-metallocene catalyzed polymers having the structural formula of any of the polyolefins or polyolefin copolymers described above. Non-limiting examples of such non-metallocene catalyzed base polyolefins can include one or more of ethylene-propylene rubber ("EPR"), ethylene propylene diene monomer ("EPDM") rubber, reactive group grafted polyolefins, polyethylene, polypropylene, and ethylene vinyl acetates with a vinyl acetate content of about 10% to about 60%. The non-metallocene catalyzed base polyolefins can be used in combination with other polymers included in the base polyolefin to impart, or control, various desired properties of the base polyolefin.

In certain embodiments, a base polyolefin can include a maleic anhydride modified polyolefin ("MAMP"). Suitable maleic anhydride modified polyolefins can include any of the polyolefins suitable for inclusion in the base polyolefin after modification with maleic anhydride. For example, in certain embodiments, maleic anhydride modified polyethylene can be included in the base polyolefin. As can be appreciated, maleic anhydride modified polyethylene is available commercially including under the trade names Lotader®, Fusabond®, Orevac®, and Elvaloy®. According to certain embodiments, a maleic anhydride modified polyolefin can be included, according to certain embodiments, at about 1% to about 15%, by weight of the base polyolefin; in certain embodiments, from about 1% to about 8%, by weight of the base polyolefin, and in certain embodiments, from about 1.5% to about 4% by weight of the base polyolefin.

In certain embodiments, the base polyolefin can include polyolefins and copolymers having melting points of about 100° C. or less. Examples of such polyolefins and copolymers can include ethylene-butene copolymer, ethylene propylene diene monomer ("EPDM"), ethylene-vinyl acetate copolymer, maleic anhydride modified polyolefin, and blends or combinations thereof.

According to certain embodiments, the base polyolefin can be included in the thermally conductive composition at about 100 phr of the thermally conductive composition. Examples of suitable base polyolefins for the thermally conductive composition can include: ethylene butene; a combination of ethylene butene and MAMP; ethylene octene; ethylene propylene rubber; and ethylene glycidyl methacrylate reactive resin.

In certain embodiments, a thermally conductive composition can include a halogenated flame retardant. Examples of suitable halogenated flame retardants can include, for example, chlorine-containing retardants, such as perchloropentacyclodecane; bromine-containing retardants, such as brominated diphenylether derivatives, brominated bisphenol derivatives, brominated epoxy resin derivatives brominated phthalimides, or combinations thereof; and phosphorus-containing retardants, such as brominated phosphates. Specific examples of suitable halogenated flame retardants can include ethylenebistetrabromophthalimide, ethane 1,2-bis (pentabromophenyl), decabromodiphenyl oxide, hexabromocyclododecane, tetrabromophthalic anhydride, or combinations thereof. A halogenated flame retardant can be included, in certain embodiments, at about 10 phr to about 70 phr, in certain embodiments, from about 20 phr to about 60 phr, and in certain embodiments, from about 30 phr to about 45 phr.

In certain embodiments, a thermally conductive composition can further include a flame retardant synergist which, in combination with a flame retardant, can augment the flame retarding performance of the composition. Examples of suitable flame retardant synergists can include antimony oxide, molybdenum oxide, or a combination thereof. In certain embodiments including antimony oxide, antimony oxide can have an average particle size varying from about 0.1 micron to about 4 microns. The flame retardant synergist can be included at about 5 phr to about 35 phr in certain embodiments, from about 10 phr to about 25 phr in certain embodiments, and from about 12 phr to about 20 phr in certain embodiments.

Certain thermally conductive compositions can also include a non-halogenated flame retardant. Examples of non-halogenated flame retardants can include metal hydroxide retardants, such as aluminum hydroxide, magnesium carbonate hydroxide, magnesium hydroxide, or combinations thereof; metal oxide flame retardants, such as aluminum oxide and/or magnesium oxide; or combinations thereof. The non-halogenated flame retardant can be included in the thermally conductive composition at about 100 phr to about 200 phr in certain embodiments, and from about 120 phr to about 140 phr in certain embodiments.

As used herein, "halogen free," "free of halogen," "non-halogenated," and similar terms are used to mean that halogen is not intentionally added to the composition and that any halogen present is in trace amounts as defined by IEC 60754-2 (2011) and/or ICEA S-90-661(2012), which specify that halogen-free materials contain less than 900 ppm chlorine or bromine, and less than 1,500 ppm total halogens.

Additional non-halogenated flame retardants can also be included in certain thermally conductive compositions. Examples of such additional non-halogenated flame retardants can include phosphorus based flame retarders, such as phosphoric acid compounds, polyphosphoric acid compounds, red phosphorus compounds, silane coated aluminumpolyphosphinates, phosphorus/nitrogen complex, triary phosphates, melamine polyphosphates, or combinations thereof. The additional non-halogenated flame retardant can be included at about 5 phr to about 50 phr in certain embodiments, from about 10 phr to about 40 phr in certain embodiments, and from about 15 phr to about 30 phr in certain embodiments.

As can be appreciated, a non-halogenated flame retardant can, in certain embodiments, be treated with surface modifiers. For example, magnesium hydroxide can be surface treated with a silane, such as, for example, vinyl silane. The average particle size of such magnesium hydroxide particles can be about 0.1 micron to about 10 microns in certain embodiments, about 0.5 micron to about 3.0 microns in certain embodiments, and about 0.8 micron to about 2.0 microns in certain embodiments.

In other certain embodiments, a thermally conductive composition can alternatively be substantially halogen free and can include a base polyolefin, a non-halogenated flame retardant selected from a metal oxide and/or a metal hydroxide, and a filler. In certain examples, the base polyolefin of a halogen-free thermally conductive composition can include about 1% to about 15%, by weight, of a maleic anhydride modified polyolefin. The halogen-free compositions can, in certain embodiments, additionally contain about 100 phr to about 200 phr of a non-halogenated flame retardant selected from a metal oxide and/or metal hydroxide, and about 5 phr to about 100 phr of a filler. As can be appreciated, any of the components of a halogenated thermally conductive composition can be used in a halogen-free composition provided such components are substantially free of any halogens.

Additional examples of halogen-free thermally conductive compositions are also disclosed in U.S. Patent App. Publication No. 2014/0166338 which is hereby incorporated by reference.

As can be appreciated, a thermally conductive composition can also include other additives that are generally used in insulated wires or cables, including, for example, one or more of a crosslinking agent, a filler, an antioxidant, a stabilizer, including UV stabilizers and/or heat stabilizers, a processing aid, a colorant, and a smoke suppressant. In certain embodiments including such components, each of the additional components can be included in ranges that do not impair the desired properties of the composition.

Non-limiting examples of suitable smoke suppressants can include zinc borate, ammonium octamolybdate, zinc hydroxyl stannate, or combinations thereof. The smoke suppressant can be included at about 5 phr to about 50 phr in certain embodiments, and in certain embodiments, from about 10 phr to about 40 phr.

A suitable filler, can be, for example, clay (preferably treated or untreated anhydrous aluminum silicate and/or calcined clay), mica, talc, expandable graphite, zinc oxide, tin oxides, molybdenum oxides, silica (including precipitated silica, hydrophilic fumed, and/or fused silica), or combinations thereof. In certain embodiments, the filler can also, or alternatively, include glass, calcium silicate, mica, calcium carbonate, glass frit, boron nitride, aluminum nitride, or combinations thereof. As can be appreciated, clay, silica, talc and expandable graphite can, in certain embodiments, be optionally treated with functional groups such as silane and/or siloxane. Additionally, in certain embodiments, certain fillers can advantageously be nano sized.

For halogenated thermally conductive compositions, a suitable filler can be included at about 5 phr to about 50 phr in certain embodiments, from about 10 phr to about 40 phr in certain embodiments, and from about about 20 phr to about 30 phr in certain embodiments. For halogen-free thermally conductive compositions, a suitable filler can be included from about 5 phr to about 100 phr in certain embodiments, from about 30 phr to about 70 phr in certain embodiments, and from about 40 phr to about 60 phr in certain embodiments.

Certain filler(s) can also be added to the thermally conductive compositions to increase the emissivity of the composition. Examples of such fillers can include, for example, metal carbides, borides, oxides, silicides, and nitrides like. Specific examples of such emissivity filler can include silicon hexaboride, silicon tetraboride, silicon carbide, boron carbide, boron silicide, molybdenum disilicide, tungsten disilicide, zirconium diboride, cupric chromite, gallium oxide, cerium oxide, zirconium oxide, manganese oxide, chromium oxides, copper chromium oxide, titanium dioxide, aluminum oxide, magnesium oxide, calcium oxide, cobalt oxide, bismuth oxide, lanthanum oxide, lithium oxide, neodymium oxide, niobium oxide, vanadium oxide, zinc oxide, iron oxide, nickel oxide, or combinations thereof. The emissivity filler can be included in the thermally conductive composition at about 1 phr to about 30 phr in certain embodiments, from about 2 phr to about 15 phr in certain embodiments, and from about 3 to about 10 phr in certain embodiments.

Suitable colorants can include, but are not limited to, carbon black, cadmium red, iron blue, or combinations thereof.

Examples of suitable antioxidants can include amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl) propionate], 4,4'-thiobis(2-tert-butyl-5-methylphenol), 2,2'-thiobis(4-methyl-6-tert-butyl-phenol), benzenepropanoic acid, 3,5 bis(1,1 dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxyhydrocinnamic acid C7-9-Branched alkyl ester, 2,4-dimethyl-6-t-butylphenol tetrakis{methylene3-(3',5'-ditert-butyl-4'-hydroxyphenol)propionate}methane or tetrakis{methylene3-(3',5'-ditert-butyl-4'-hydrocinnamate}methane, 1,1,3tris(2-methyl4hydroxyl5butylphenyl)butane, 2,5,di t-amyl hydroqunone, 1,3,5-tri methyl2,4,6tris(3,5di tert butyl4hydroxybenzyl)benzene, 1,3,5tris(3,5 di tert butyl4hydroxybenzyl)isocyanurate, 2,2 methylene-bis-(4-methyl-6-tert butyl-phenol), 6,6'-di-tert-butyl-2,2'-thiodi-p-cresol or 2,2'-thiobis(4-methyl-6-tert-butylphenol), 2,2ethylenebis(4,6-di-t-butylphenol), triethyleneglycol bis{3-(3-t-butyl-4-hydroxy-5methylphenyl)propionate}, 1,3,5tris(4tert butyl3hydroxy-2,6-dimethylbenzyl)-1,3,5-triazine-2,4,6-(1H,3H,5H)trione, 2,2methylenebis{6-(1-methylcyclohexyl)-p-cresol}; and/or sulfur antioxidants, such as bis(2-methyl-4-(3-n-alkylthiopropionyloxy)-5-t-butylphenyl) sulfide, 2-mercaptobenzimidazole and its zinc salts, pentaerythritol-tetrakis(3-lauryl-thiopropionate), or combinations thereof. As can be appreciated, a blend of multiple antioxidants, such as a blend of zinc 2-mercaptobenzimidazole and polymeric 2,2,4-trimethyl-1,2-dihydroquinoline can be particularly advantageous. The antioxidant can be included at about 1 phr to about 8 phr in certain embodiments, at about 2 phr to about 5 phr in certain embodiments, and at about 3 phr to about 4 phr in certain embodiments.

Suitable stabilizers can include at least UV stabilizers and/or heat stabilizers. Examples of suitable UV stabilizers can include, for example, benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, or combinations thereof. Specific examples of such UV stabilizers can include, but is not limited to, 2,2"-methylenebis(6-(2H-benzotriazol-2-yl)-4-4 (1,1,3,3,-tetramethylbutyl-)phenol, available as LA-31 RG from Amfine Chemical and having CAS 103597-45-1; 2,2'-(p-phenylene) bis-4H-3,1-benzoxazin-4-one, available as Cyasorb UV-3638 from Cytec® and having CAS 18600-59-4.

Alternatively, or in addition, a suitable UV stabilizer can be a hindered amine light stabilizer ("HALS"). Examples of suitable HALS can include, bis(2,2,6,6-tetramethyl-4-piperidyl)sebaceate; bis(1,2,2,6,6-tetramethyl-4-piperidyl)sebaceate+methyl1,2,2,6,6-tetramethyl-4-piperidyl sebaceate; 1,6-hexanediamine, N,N'-Bis(2,2,6,6-tetramethyl-4-piperidyl)polymer with 2,4,6 trichloro-1,3,5-triazine, reaction products with N-butyl2,2,6,6-tetramethyl-4-piperidinamine; decanedioic acid, bis(2,2,6,6-tetramethyl-1-(octyloxy)-4-piperidyl)ester, reaction products with 1,1-dimethylethylhydroperoxide and octane; triazine derivatives; butanedioc acid, dimethylester, polymer with 4-hydroxy-2,2,6,6-tetramethyl-1-piperidine ethanol; 1,3,5-triazine-2,4,6-triamine,N,N''''-[1,2-ethane-diyl-bis[[[4,6-bis-[butyl(1,2,2,6,6pentamethyl-4-piperdinyl)amino]-1,3,5-triazine-2-yl]imino-]-3,1-propanediyl]]bis[N',N''-dibutyl N',N''bis(2,2,6,6-tetramethyl-4-pipe-ridyl]; and/or bis (1,2,2,6,6-pentamethyl-4-piperidinyl) sebacate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid, 3,5-bis(1,1-dimethyl-ethyl)-4-hydroxy-C7-C9 branched alkyl esters,isotridecyl-3-(3,5-di-tert-butyl-4-hydroxyphenyl) propionate, bis(1,2,2,6,6-pentamethyl-4-piperidinyl) sebacate or a combination thereof.

Examples of suitable heat stabilizers can include, but are not limited to, 4,6-bis (octylthiomethyl)-o-cresol dioctadecyl 3,3'-thiodipropionate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid, 3,5-bis(1,1-dimethyl-ethyl)-4-hydroxy-C7-C9 branched alkyl esters; isotridecyl-3-(3,5-di-tert-butyl-4-hydroxyphenyl) propionate. In certain embodiments, the heat stabilizer can be 4,6-bis (octylthiomethyl)-o-cresol which is commercially available as Irgastab® KV-10 from BASF, dioctadecyl 3,3'-thiodipropionate and/or poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]].

A processing aid can optionally be used to improve the processability of the thermally conductive composition. A processing aid forms a microscopic dispersed phase within the polymer carrier. During processing, the applied shear separates the process aid phase from the carrier polymer phase. The process aid then migrates to the die wall and gradually forms a continuous coating layer to reduce the backpressure of the extruder and reduce friction during extrusion. The processing aid can generally be a lubricant, such as, for example, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or a combination thereof. Processing aids can also be commercially obtained including, for example, Struktol®, Ultraflow™, Moldwiz®, and Aflux®, each of which is a blend of fatty acids. The process aid can be included at about 10 phr or less in certain embodiments, at about 5 phr or less in certain embodiments, and at about 1 phr or less in certain embodiments. In certain embodiments, the thermally conductive composition can also be substantially free of a process aid. As used herein, "substantially free" means that the component is not intentionally added to the composition or that the component is not detectable with current analytical methods. As can be appreciated, lower loading quantities of process aid can be beneficial as processing aids generally lower the conductivity of a composition.

Thermally conductive compositions can be prepared by blending the components in conventional masticating equipment such as, for example, a rubber mill, a Brabender Mixer, a Banbury Mixer, a Buss-Ko Kneader, a Farrel continuous mixer or a twin screw continuous mixer. In certain embodiments, the additives can be premixed before the addition of the base polymer. Mixing times can then be selected to obtain homogeneous blends. In certain embodiments, all of the components of the thermally conductive compositions can be blended, or compounded, together prior to their introduction into an extrusion device which can extrude the thermally conductive composition onto an electrical conductor or cable.

After the various components of the composition are uniformly admixed and blended together, they can be further processed to fabricate cables. Prior art methods for fabricating polymer cable insulation or cable jacket are well known, and fabrication of a cable can generally be accomplished by any of the known various extrusion methods.

In a typical extrusion method, an optionally heated conducting core to be coated is pulled through a heated extrusion die, generally a cross-head die, in which a layer of melted polymer, or composition, is applied to the conducting core. Upon exiting the die, if the polymer is adapted as a thermoset composition, the conducting core with the applied polymer layer may be passed through a heated vulcanizing section, or continuous vulcanizing section and then a cool ing section, generally an elongated cooling bath, to cool. Multiple polymer layers can be applied by consecutive extrusion steps in which an additional layer is added in each step, or with the proper type of die, multiple polymer layers can be applied simultaneously.

A conductor can generally include any suitable electrically conducting material, although generally electrically conductive metals are utilized. Suitable metals can include copper, aluminum, a copper alloy, an aluminum alloy (e.g. aluminum-zirconium alloy), or any other conductive metal or alloy thereof.

Cables having insulation and/or jacket layers formed with thermally conductive compositions described herein can maintain desired electrical, physical, and mechanical properties. For example, a cable with such jacket and insulation layers can pass the UL 1581 VW-1 flame test and can pass the UL 44 LTIR tests. As can be appreciated, such cables can be used in a variety of applications including low voltage applications (e.g., less than about 2000 V), such as underground power transport, utility power distribution, mining, automotive, railway, transport vehicles, aerospace, renewable energy, solar, wind, nuclear, oil and gas, cord, food, medical, industrial, data communication, specialty, building and construction, and military applications.

EXAMPLES

As depicted in Tables 1 and 2, example compositions 1 to 11 were produced from the components listed in each respective table. Table 1 further depicts the elongation at break, the thermal conductivities (at both 75° C. and 100° C.), and the UL-1581 VW-1 test results of each of the example compositions 1 to 8. Table 2 further depicts the thermal conductivity at 100° C. and the UL-1581 VW-1 test results of example compositions 9 to 11. Elongation at break, which indicates the ductility of the material, was measured in accordance to ASTM D412 (2010) using a Zwick universal testing machine or an Instron Tester. Thermal conductivity was measured in accordance to ASTM E1952 (2011), mDSC method, using two different thickness samples to measure enthalpy values of the example compositions. Thermal conductivity was calculated from the enthalpy values. VW-1 qualification testing was conducted in accordance to UL 2556 (2013) on a 14 American Wire Gauge ("AWG") conductor with at least a 30 mil thick insulation layer.

TABLE 1

| Components | 1 | 2 | 3 | 4 | 5 | 6 | 7 | 8 |
|---|---|---|---|---|---|---|---|---|
| Ethylene-butene copolymer | 95 | 95 | 95 | 95 | 95 | 95 | 95 | 95 |
| Ethylenebistetra-bromophthalimide | — | 45 | 30 | 45 | 45 | 30 | 30 | 30 |
| Antimony trioxide | — | 20 | 12.5 | 20 | 20 | 12.5 | 12.5 | 12.5 |
| Magnesium hydroxide | 160 | — | 140 (talc) | 140 | 120 | 160 | 140 | 120 |
| Maleic Anhydride Modified Polyethylene | 5 | 5 | 5 | 5 | 5 | 5 | 5 | 5 |
| Zinc Oxide | 5 | 5 | 5 | 5 | 5 | 5 | 5 | 5 |
| 50% wax, 50% silane masterbatch | 2 | 2 | 2 | 2 | 2 | 2 | 2 | 2 |
| 1,2-dihydro-2,2,4-trimethylquinoline | 1.5 | 1.5 | 1.5 | 1.5 | 1.5 | 1.5 | 1.5 | 1.5 |
| 80% Lead oxide stabilizer in EPM | 5 | 5 | 5 | 5 | 5 | 5 | 5 | 5 |
| Peroxide | 2.8 | 2.8 | 2.8 | 2.8 | 2.8 | 2.8 | 2.8 | 2.8 |
| Total | 276.3 | 181.3 | 298.8 | 321.3 | 301.3 | 318.8 | 298.8 | 278.8 |
| Properties | | | | | | | | |
| Elongation at Break (%) | 283.1 | 748.9 | 131.8 | 261.8 | 326.3 | 242.1 | 314.7 | 399.2 |
| Thermal Conductivity W/mK at 75° C. | 0.40 | 0.24 | 0.31 | 0.34 | 0.31 | 0.37 | 0.35 | 0.33 |
| Thermal Conductivity W/mK at 100° C. | 0.39 | 0.23 | 0.32 | 0.33 | 0.32 | 0.38 | 0.37 | 0.31 |
| VW-1 Test Results | Fail | Pass | Fail | Pass | Pass | Pass | Pass | Pass |

As depicted in Table 1, example compositions 1 to 3 are comparative. Compositions 1 and 3 are comparative because each fails the VW-1 flame test. Composition 2 is comparative because it exhibits a thermal conductivity of less than 0.30 W/mK. Examples 4 through 8 are inventive because each exhibits a thermal conductivity greater than 0.30 W/mK, elongation at break greater than 100% and passes the UL 1581 VW-1 flame test.

TABLE 2

| Components | 9 | 10 | 11 |
|---|---|---|---|
| Ethylene-butene copolymer | 20 | 20 | 20 |
| Ethylene propylene diene monomer rubber | 30 | 30 | 30 |
| Ethylene-vinyl acetate copolymer | 60 | 60 | 60 |
| Ethylenebistetra-bromophthalimide | 46 | 46 | 35 |
| Antimony trioxide | 17 | 17 | 15 |
| Magnesium hydroxide | 60 | 100 | 100 |
| Zinc Oxide | 5 | 5 | 5 |
| 50% wax, 50% silane masterbatch | 2 | 2 | 2 |
| 1,2-dihydro-2,2,4-trimethylquinoline | 1.5 | 1.5 | 1.5 |
| 80% Lead oxide stabilizer in EPM | 5 | 5 | 5 |
| Peroxide | 2.8 | 2.8 | 2.8 |
| Total | 249.3 | 289.3 | 276.3 |
| VW-1 Test Results | Pass | Pass | Pass |
| Thermal Conductivity W/mK at 100° C. | 0.26 | 0.31 | 0.33 |

As depicted in Table 2, additional example compositions were produced. Example compositions 9 is comparative because it exhibits a thermal conductivity below 0.30

W/mK. Compositions 10 and 11 are inventive because each exhibits a thermal conductivity greater than 0.30 W/mK and pass the UL 1581 VW-1 flame test.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable consisting of:
    a conductor; and
    an insulation layer,
    wherein the insulation layer is formed of a thermally conductive composition comprising:
        a base polyolefin;
        a halogenated flame retardant;
        from about 90 phr to about 200 phr of a non-halogenated flame retardant, the non-halogenated flame retardant comprising magnesium hydroxide; and
        a flame retardant synergist; and
    wherein the thermally conductive composition has a thermal conductivity of 0.30 W/mK or more and the cable passes the UL 1581 VW-1 test.

2. The cable of claim 1, wherein the thermally conductive composition comprises about 10 phr to about 70 phr of the halogenated flame retardant, and the halogenated flame retardant comprises a brominated flame retardant.

3. The cable of claim 1, wherein the thermally conductive composition comprises about 5 phr to about 35 phr of the flame retardant synergist, and the flame retardant synergist comprises antimony oxide.

4. The cable of claim 1, wherein the magnesium hydroxide is surface treated with vinyl silane.

5. The cable of claim 1, wherein the magnesium hydroxide has a mean particle size of about 0.1 micron to about 10 microns.

6. The cable of claim 1, wherein the thermally conductive composition further comprises one or more of a crosslinking agent, a filler, an antioxidant, a stabilizer, a colorant, a processing aid, a smoke suppressant, and a second non-halogenated flame retardant.

7. The cable of claim 6, wherein the thermally conductive compositions comprises about 10 phr, or less, of the processing aid.

8. The cable of claim 6, wherein the thermally conductive composition comprises about 5 phr to about 50 phr of at least one of the filler or the smoke suppressant.

9. The cable of claim 6, wherein the thermally conductive composition comprises a second non-halogenated flame retardant, wherein the second non-halogenated flame retardant comprises a phosphorus based flame retarder.

10. The cable of claim 1, wherein the thermally conductive composition passes the UL-44 Long Term Insulation Resistance (LTIR) test at 90° C.

11. The cable of claim 1, wherein the thermally conductive composition has an emissivity greater than about 0.5.

12. The cable of claim 1, wherein the base polyolefin comprises ethylene-butene copolymer, ethylene propylene diene monomer rubber, ethylene-vinyl acetate copolymer, or a blends or combinations thereof.

13. The cable of claim 1, wherein the base polyolefin further comprises a maleic anhydride modified polyolefin.

14. The cable of claim 13, wherein about 1% to about 15% of the base polyolefin comprises the maleic anhydride modified polyolefin.

15. The cable of claim 1, wherein the conductor is formed from one or more of copper, aluminum, a copper alloy, and an aluminum alloy.

16. The cable of claim 1, wherein the thermally conductive composition exhibits an elongation at break of about 100% or more.

* * * * *

UNITED STATES PATENT AND TRADEMARK OFFICE
CERTIFICATE OF CORRECTION

PATENT NO.       : 9,777,206 B2
APPLICATION NO.  : 14/566134
DATED            : October 3, 2017
INVENTOR(S)      : Sathish Kumar Ranganathan et al.

It is certified that error appears in the above-identified patent and that said Letters Patent is hereby corrected as shown below:

In the Specification

Column 2, Line 62, change "po lycotene" to --polyoctene--;

Column 3, Lines 52-53, change "bicylco-(2,2,1)-hepta-2-5-iene" to --bicylco-(2,2,1)-hepta-2-5-diene--;

Column 3, Lines 53-54, change "cyclo alkylidene" to --cycloalkylidene--;

In the Claims

Claim 7, Column 12, Line 27, change "compositions comprises" to --composition comprises--; and Claim 12, Column 12, Line 44, change "a blends" to --a blend--.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*